United States Patent
Gabrielson (10) Patent No.: US 9,521,194 B1
(45) Date of Patent: Dec. 13, 2016

(54) NONDETERMINISTIC VALUE SOURCE

(71) Applicant: Amazon Technologies, Inc., Seattle, WA (US)

(72) Inventor: Jacob Adam Gabrielson, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 61 days.

(21) Appl. No.: 14/659,451

(22) Filed: Mar. 16, 2015

(51) Int. Cl.
*G06F 11/00* (2006.01)
*H04L 29/08* (2006.01)
*G06F 11/20* (2006.01)

(52) U.S. Cl.
CPC ....... *H04L 67/1095* (2013.01); *G06F 11/2023* (2013.01)

(58) Field of Classification Search
USPC .................................................. 714/4.1, 4.11
See application file for complete search history.

(56) References Cited

U.S. PATENT DOCUMENTS

2005/0273507 A1* 12/2005 Yan ................... H04L 41/0896 709/223
2013/0042145 A1* 2/2013 Pasupuleti .......... G06F 11/3684 714/32

* cited by examiner

*Primary Examiner* — Sarai Butler
(74) *Attorney, Agent, or Firm* — Thorpe North & Western LLP (57) ABSTRACT

A technology is described for providing a nondeterministic value to computing instances executing an application as part of a high availability system. An example method may include receiving a request for a nondeterministic value at a physical host that hosts a first computing instance, where the request may be for an application executing on the first computing instance. A nondeterministic value may be obtained from a nondeterministic value source located on the physical host and provided to the application executing on the first computing instance. A second request from a second computing instance may be received at the physical host, where the second request may be associated with a copy of the application executing on the second computing instance. The nondeterministic value may then be identified in the computer memory of the physical host and provided to the second computing instance over a computer network.

20 Claims, 9 Drawing Sheets

(1) First computing instance request for a first nondeterministic value (2) Second computing instance request for a first nondeterministic value

Computing Service Environment 202

High Availability System 204

Physical Host 206

Primary Computing Instance 208

Application 210

Instance Manager 214

Request Coordination Service 216

212

Request Log(s) — 226
Request Identifier — 228
Nondeterministic Value — 230

Physical Host(s) 218

Instance Manager

232 — Request Module

Redundant Computing Instance 220

Application Copy 222

(1) First computing instance request for a first nondeterministic value (2) Second computing instance request for a first nondeterministic value

FIG. 5a (3) First computing instance request for a second nondeterministic value (4) Second computing instance request for a second nondeterministic value

NONDETERMINISTIC VALUE SOURCE

BACKGROUND

The advent of virtualization technologies for computing resources has provided benefits with respect to managing large-scale computing resources for many users with diverse needs and has allowed various computing resources or computing services to be efficiently and securely shared by multiple users. For example, virtualization technologies may allow a single physical computing machine to be shared among multiple users by providing each user with one or more computing instances hosted by the single physical computing machine using a an instance manager (e.g., a hypervisor or a Virtual Machine Manager (VMM)). Each computing instance may be a guest machine acting as a distinct logical computing system that provides a user with the perception that the user is the sole operator and administrator of a given virtualized hardware computing resource.

Computing instances may be utilized to execute applications within a high availability system. High availability may refer to a system or component that may be near continuously operational for a significant duration of time. Utilizing multiple computing instances to execute applications may provide redundancy within a system, thereby providing high availability by failing over to a redundant computing instance when a failure of a primary computing instance occurs. For example, multiple applications of the same kind may execute on computing instances (e.g., hosted by separate physical computing machines) and may be incorporated into a system design that includes a method to detect failure of an application and automatically reconfigure the system to bypass the failed application.

DETAILED DESCRIPTION

A technology is described for a centralized nondeterministic value source that provides nondeterministic values to computing instances included in a high availability system. In one example configuration, a nondeterministic value service may be used to generate a nondeterministic value (e.g., a non-static value, such as a random value, a hardware timer value, a software timer value, or the like). The nondeterministic value may be provided to primary and redundant computing instances (or software containers) executing an application (e.g., a computer program, script, app, or other software) within a high availability system in response to requests from the primary and redundant computing instances for a nondeterministic value.

For example, a first computing instance and a second computing instance may be configured as a redundant pair (e.g., a primary computing instance and a redundant computing instance). A nondeterministic service may be configured to generate and provide a nondeterministic value to the first computing instance in response to a nondeterministic value request. A duplicate of the nondeterministic value may be provided to the second computing instance in response to a duplicate request made by the second computing instance. Additional redundant computing instances (e.g., a second, third or additional redundant computing instances) included in a high availability system making duplicate requests may also be provided with the duplicate nondeterministic value. Consequently, in the event that a primary computing instance fails, a failover may be performed to a redundant computing instance executing a copy of an application that the failed primary computing instance had been executing. The redundant computing instance should be exactly the same as the primary computing instance because they have both received the identical deterministic and non deterministic inputs.

Existing high availability systems may include multiple nondeterministic value sources (e.g., operating systems, hypervisors, random number generators, clocks) that provide redundant computing instances with non-duplicate nondeterministic values. For example, when executed on a first computing instance, an application may include an instruction that requests a random number from the operating system of the first computing instance and in response, may be provided with a random number generated by the operating system. A copy of the application executing on a second computing instance may include the same instruction that requests a random number from the operating system of the second computing instance. As a result of receiving a random number from two different random number sources, the random number generated by the operating system of the first computing instance may be different from the random number generated by the operating system of the second computing instance. As such, the states of the applications executing on the first and second computing instances may be different.

The present technology provides for a single nondeterministic value source that tracks nondeterministic value requests from a first computing instance included in a high availability system and provides duplicate nondeterministic values to one or more secondary computing instances that correspond to the nondeterministic value requests received from the first computing instance. As a result of providing duplicate nondeterministic values in response to duplicate requests for the nondeterministic value from a second computing instance, the state of an application executing on a first computing instance and the state of a copy of the application executing on the second computing instance may be identical.

Figure 1:
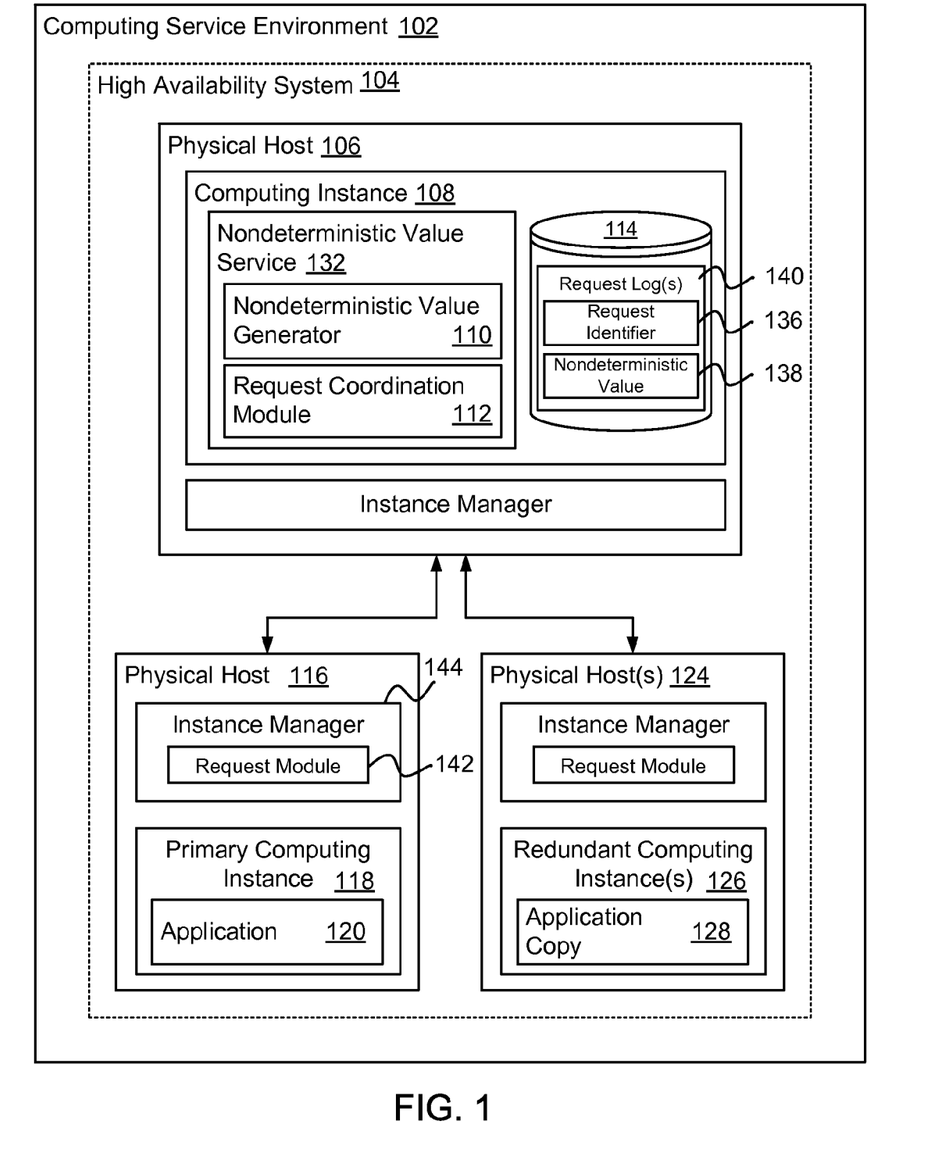
FIG. 1 is a block diagram illustrating an example of a high availability system that includes a nondeterministic value service that provides nondeterministic values to computing instances.

FIG. 1 is a block diagram illustrating components of an example high availability system 104 implemented within a computing service environment 102. The high availability system 104 may include a physical host 106 that may be in network communication with a plurality of other physical hosts 116 and 124 that host computing instances 118 and 126. The physical hosts 106, 116 and 124 may comprise the high availability system 104 via a redundancy of computing instances 118 and 126 and applications 120 and 128 that execute on the physical hosts 116 and 124. The computing instances 118 and 126 may be configured to request nondeterministic values from a nondeterministic value service 132 in relation to executing an application 120 and 128 on the computing instances 118 and 126.

Illustratively, a customer wishing to configure a high availability system 104 may utilize a console or Application Programming Interface (API) to launch a group of computing instances 118, 126 that are configured as a redundant pair. For example, a customer may select instances 118, 126 via a command console and specify that the instances 118, 126 are to operate as a high availability group. Alternatively, API parameters for a computing instance launch request may be set to specify that the computing instances 118, 126 are within a high availability group.

A physical host 116 may host a primary computing instance 118 that executes an application 120. The primary computing instance 118 and application 120 may be used to provide a high availability service or computing process to end users (e.g., a web service, database service, business management service, etc.). The physical host(s) 124 may host redundant computing instance(s) 126 that execute an application copy 128 (i.e., a copy of the application 120). In the event that the primary computing instance 118 fails, a failover may be performed to one of the redundant computing instances 126. Accordingly, the application copy 128 is desired to be executed on the redundant computing instance(s) 126 in near parallel with the application 120 executed on the primary computing instance 118.

Further, the states of the application 120 and the application copy 128 may be synchronized by ensuring that nondeterministic values used in executing the application 120 and the application copy 128 are obtained from the nondeterministic value service 132, and that a nondeterministic value provided to the primary computing instance 118 in response to a particular nondeterministic value request is also provided to the redundant computing instance(s) 126 in response to an equivalent nondeterministic value request or an identical nondeterministic value request.

In one example, the primary computing instance 118 may execute an application instruction that results in a request for a nondeterministic value. The nondeterministic value may be a random number, hardware time value (e.g., real time clock value), software time value, or other nondeterministic value. The primary computing instance 118 may be configured to make a request for the nondeterministic value to the nondeterministic value service 132 located on the computing instance 108. More specifically, a nondeterministic request may be transmitted to the nondeterministic value service 132 using a request module 142 included in an instance manager 144 (e.g., a hypervisor or a Virtual Machine Manager). The request module 142 may be configured to obtain nondeterministic values from the nondeterministic value service 132 in response to nondeterministic value requests made by an application 120 or an application copy 128. For example, an application 120 or application copy 128 may execute an instruction that results in a request for a nondeterministic value. The request may be transmitted to an instance manager 144, where a request module 142 may handle the request by transmitting the request to the nondeterministic value service 132.

Upon receiving the nondeterministic value request, the nondeterministic value service 132 may be configured to obtain a nondeterministic value from a nondeterministic value generator 110, and then return the nondeterministic value to the primary computing instance 118 by way of the request module 142. The nondeterministic value generator 110 may be configured to generate a nondeterministic value type specified in a parameter. Illustratively, in the case that the parameter specifies a random number type, an Application Programming Interface (API) call may be made to a random number generator (e.g., dev/random) for a random number and the random number may be returned to the primary computing instance 118. In the case that the parameter specifies a time value type, an API call may be made to a hardware timer or software timer for a time value, which may then be returned to the primary computing instance 118. The nondeterministic value 138 provided to the primary computing instance 118 may be stored along with a request identifier 136 for the nondeterministic value request in a request log 140 stored on a data store 114 so that the nondeterministic value 138 may be retrieved in response to a nondeterministic value request made by a redundant computing instance 126.

As described above in relation to the primary computing instance 118, the redundant computing instance 126 may likewise execute an application instruction that results in a request for a nondeterministic value. Because the redundant computing instance 126 may execute an application copy 128 that may be identical to the application 120 executing on the primary computing instance 118, the application instruction executed by the redundant computing instance 126 may be identical to the application instruction executed on the primary computing instance. In response, the redundant computing instance 126 may be configured to request a nondeterministic value from the nondeterministic value service 132.

Upon receiving the request from the redundant computing instance 126, the nondeterministic value service 132 may be configured to use a request coordination module 112 to identify the request (e.g., identify a request identifier 136 for the request) and identify a request previously made by the primary computing instance 118 that corresponds to the request from the redundant computing instance 126. For example, a request identifier 136 may be a unique identifier assigned to a specific nondeterministic value request. For instance, a request identifier 136 may identify a nondeterministic request as a first request, second request, third request, and so on. The request identifier 136 may be included in a nondeterministic request received by the nondeterministic value service 132, or may be assigned by using the request coordination module 112. The request identifier 136 may be used by the request coordination module 112 to correlate a nondeterministic value request received from the primary computing instance 118 with a nondeterministic value request received from the redundant computing instance 126. The nondeterministic value service 132 may be configured to retrieve a nondeterministic value 138 associated with the request identifier 136 from a request log 140 stored on a data store 114 and return the nondeterministic value to the redundant computing instance 126. As a specific example, a first nondeterministic value request received from a primary computing instance 118 may be assigned a request identifier 136 having a value of "0001". When a first nondeterministic value request is received from a redundant computing instance 126, the request may include a request identifier 136 having the value "0001", or may be assigned the request identifier 136 having the value "0001". The request identifier 136 having the value "0001" may be used to retrieve a nondeterministic value 138 associated with the request identifier 136. Thus, the primary redundant computing instances may be linked together in the request logs 140 using the request identifier 136.

In one example configuration, a request identifier 136 and associated nondeterministic value 138 may be stored to a request log 140 in the data store 114. A request log 140 may be associated with a particular computing instance (e.g., a primary computing instance 118 or a redundant computing instance 126). When a nondeterministic value request is received from a computing instance 118 or 126, the request log 140 for the computing instance 118 or 126 may be referenced to determine the identity of the request (e.g., whether the request is a first request, second request, etc.) and a request identifier 136 may then be assigned to the nondeterministic value request according to the identity of the request. Requests logs 140 for other computing instances 118 or 126 may then be referenced to determine whether a nondeterministic value request matching the request identifier 136 may have been received from one or more of the computing instances 118 or 126. In the case that the request logs 140 of the other computing instances 118 or 126 do not include the request identifier 136, a nondeterministic value may be generated (via the nondeterministic value generator 110) and provided to a requesting computing instance 118 or 126, and the nondeterministic value 138 and request identifier 136 may be stored to the data store 114. In the case that the request logs 140 of the other computing instances 118 or 126 do contain the request identifier 136, the nondeterministic value 138 associated with the request identifier 136 may be obtained from the request log 140, and the nondeterministic value 138 may be returned to the requesting computing instance 118 or 126.

Alternatively, nondeterministic values provided to a primary computing instance 118 and associated request identifiers may be stored in computer memory or a memory cache. A nondeterministic value may then be removed from the computer memory after responding to a second (or Nth) nondeterministic value request in which the nondeterministic value was provided, or the nondeterministic value may be deleted after a certain amount of time (e.g., 2, 5, or 7 minutes).

As an illustration, upon receiving a first nondeterministic value request from a primary computing instance 118, the nondeterministic value service 132 may provide the request to the request coordination module 112, which may be configured to identify a requesting computing instance 118 or 126. Having identified the primary computing instance 118 as the requester, a request log 140 associated with the primary computing instance 118 may be referenced to determine the identity of the request and assign a request identifier 136 according to the identity of the request. For instance, the request log 140 for the primary computing instance 118 may not contain any entries, indicating that the request is the first nondeterministic value request received from the primary computing instance 118. As a result, the request identifier 136 assigned to the request may be a request identifier 136 representing a "first request". Request logs 140 for redundant computing instances 126 may be referenced to determine whether the request logs 140 include the request identifier 136. In the case that the request logs 140 for the redundant computing instances 126 do not contain the request identifier 136, a nondeterministic value may be generated and provided to the primary computing instance 118, and an entry to the request log 140 for the primary computing instance 118 may be made that includes the request identifier 136 and the nondeterministic value 138.

Having fulfilled the nondeterministic value request for the primary computing instance 118, the nondeterministic value service 132 may receive a first nondeterministic request from a redundant computing instance 126. The request coordination module 112 may be used to identify the requesting computing instance as a redundant computing instance 126 and a request log 140 for the redundant computing instance 126 may be referenced to determine the identity of the request. For instance, the request log 140 for the redundant computing instance 126 may not contain any entries, indicating that the request is a first nondeterministic value request, whereupon a request identifier 136 representing a "first request" may be assigned. A request log 140 for the primary computing instance 118 may then be referenced to determine whether the request log 140 includes the "first request" request identifier 136. In the case that the request log 140 does contain the request identifier 136, a nondeterministic value 138 associated with the request identifier 136 in the request log 140 may be retrieved and provided to the redundant computing instance 126. Consequently, the redundant computing instance 126 may receive a duplicate of the nondeterministic value 138 associated with a first request for a nondeterministic value that was provided to the primary computing instance 118.

Although the above illustration describes that a nondeterministic value request may be first received from the primary computing instance 118 and a duplicate of a nondeterministic value provided to the primary computing instance 118 may be provided to the redundant computing instance 126, a nondeterministic value request from the redundant computing instance(s) 126 may be received prior to a nondeterministic value request from the primary computing instance 118. Coordination of request identifiers 136 and nondeterministic values 138 provided to the computing instances 118 and 126 may be maintained using the request logs 140 for the computing instances 118 and 126 as described above. As such, a nondeterministic value request may be first received from either of the computing instances 118 and 126 and then a duplicate request can be managed accordingly.

Figure 2:
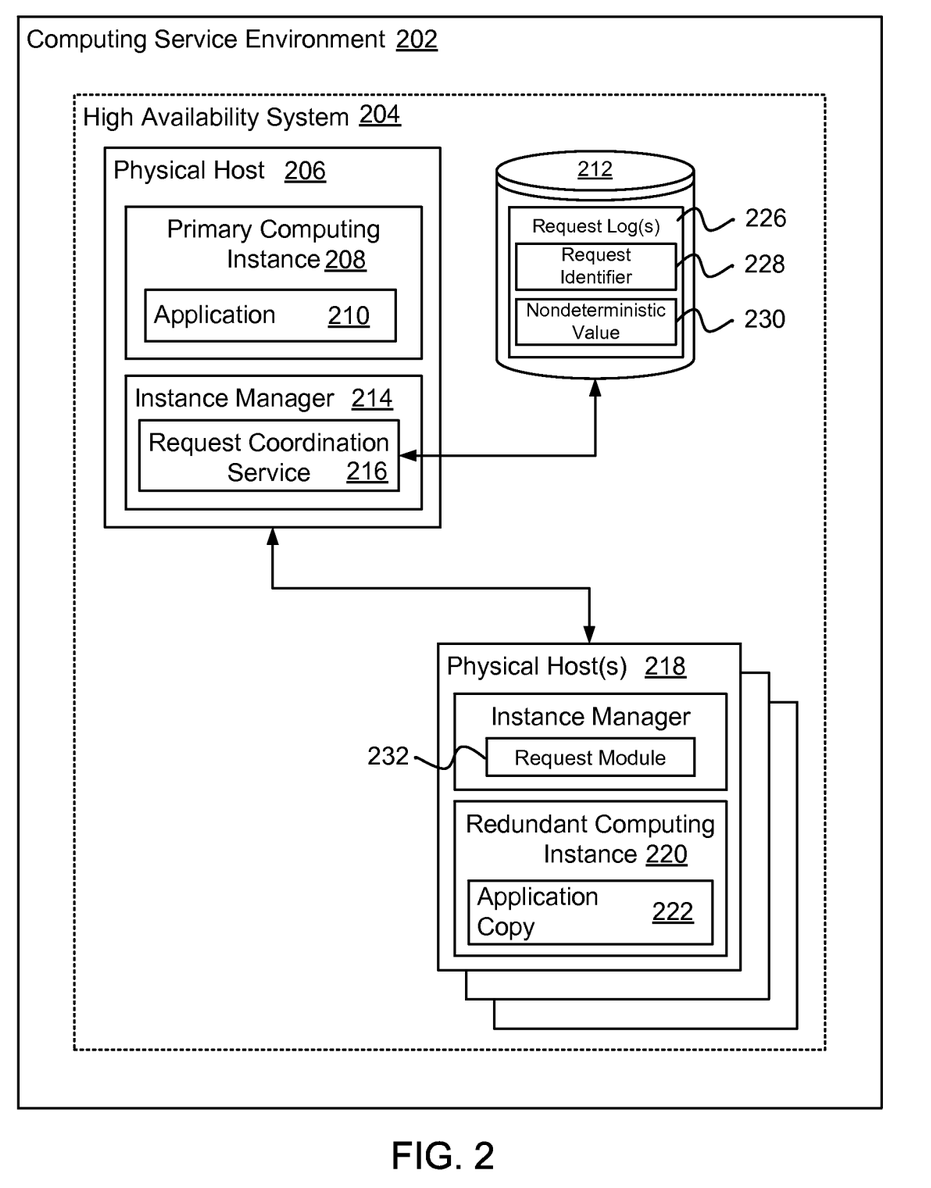
FIG. 2 is a block diagram that illustrates an example high availability system that includes a computing instance that serves as a nondeterministic value source for one or more redundant computing instances.

FIG. 2 is a block diagram that illustrates an example of the present technology where a primary computing instance 208 serves as a nondeterministic value source for one or more redundant computing instances 220. A computing system environment 202 may be utilized for a high availability system 204 that includes a number of physical hosts 206 and 218 that host computing instances 208 and 220. For example, a physical host 206 may host a primary computing instance 208 that executes an application 210 that is part of a system providing a high availability service. One or more additional physical hosts 218 may host redundant computing instances 220 that execute an application copy 222 (i.e., copies of the application 210). In the event of a failure of the primary computing instance 208, a failover may be performed to a redundant computing instance 220 that may be executing an application copy 222 in near parallel with the execution of the application 210 on the primary computing instance 208 at the time of the failure.

In one example configuration of the high availability system 204, the primary computing instance 208 may act as the source of nondeterministic values that may be provided to redundant computing instances 220. In other examples, any of the computing instances 208 or 220 may act as the nondeterministic value source. Illustratively, the primary computing instance 208 may execute an application 210 instruction that results in a request for a nondeterministic value. The operating system of the primary computing instance 208 may generate a nondeterministic value in response to the request and the nondeterministic value may then be used in the execution of the application 210. The nondeterministic value may also be provided to redundant computing instances 220 that request nondeterministic values.

In another example configuration of the high availability system 204, the physical host 206 may act as the source of nondeterministic values provided to computing instances 208 and 220. For example, an instance manager 214 located on the physical host 206 hosting the primary computing instance 208 may be configured to generate nondeterministic values in response to a nondeterministic value request. Illustratively, the instance manager 214 may include a kernel module that generates nondeterministic values. A nondeterministic value generated by the instance manager 214 may be provided to the primary computing instance 208 and to redundant computing instances 220 requesting the nondeterministic value.

The instance manager 214 may include a request coordination service 216. The request coordination service 216 may perform the functions as described in relation to FIG. 1 (e.g., coordinates nondeterministic value requests received from the primary computing instance 208 and any redundant computing instances 220). Illustratively, a nondeterministic value generated by the operating system of the primary computing instance 208 or by the instance manager 214 may be provided to the request coordination service 216, as well as a request identifier 228 (e.g., an identifier used to track the request). The nondeterministic value 230 and the request identifier 228 may then be added to a request log 226 for the primary computing instance 208 stored in a data store 212.

Redundant computing instances 220 may be configured to send nondeterministic value requests to the request coordination service 216 located on the instance manager 214. Upon receiving a nondeterministic value request from a redundant computing instance 220, the request coordination service 216 may be configured to identify a request identifier 228 for the nondeterministic value request (e.g., an identifier representing a first request, second request, or the like) and a nondeterministic value 230 may be retrieved from the request log 226 for the primary computing instance 208. The nondeterministic value 230 may be associated with the request identifier 228. For example, in the case that a nondeterministic value request received from a redundant computing instance 220 is identified as an nth request (i.e., an nth nondeterministic value request received from the redundant computing instance 220), the request log 226 for the primary computing instance 208 may be referenced and a nondeterministic value 230 associated with a request identifier 228 representing the nth request may be retrieved from the request log 226 and provided to the redundant computing instance 220.

Having identified a request identifier 228 and a nondeterministic value 230 in response to the request from the redundant computing instance 220, a request log 226 for the redundant computing instance 220 may be updated with the request identifier 228 and the nondeterministic value 230. Updating a request log 226 for the redundant computing instance 220 results in an audit trail that may be used to identify the identity of a nondeterministic value request and a nondeterministic value 230 provided to the redundant computing instance 220.

In one example, a synchronization service (not shown) may be used to detect that a sequence of nondeterministic values 230 used by a primary computing instance 208 may be different than a sequence of nondeterministic values 230 provided to a redundant computing instance 220. For instance, the state of an application 210 and an application copy 222 may be kept near identical by providing a nondeterministic value to a primary computing instance 208 and a duplicate of the nondeterministic value to a redundant computing instance 220. In the event that a non-duplicate nondeterministic value is provided to the redundant computing instance 220, the states of the application 210 and the application copy 222 are no longer the same, and in one case, an alarm may be triggered.

Detecting that the states of the application 210 and the application copy 222 are different may be determined by comparing the request logs 226 for the computing instances 208 and 220. For example, a comparison of request identifiers 228 and associated nondeterministic values 230 may show discrepancies in nondeterministic values that have been provided to the computing instances 208 and 220. In one example, if the comparison of the request logs 226 shows a discrepancy, the redundant computing instance 220 may be removed from a pool of redundant computing instances 220 executing the application copy 222 by terminating the computing instance 220. In another example, if the comparison of the request logs 226 shows a discrepancy, the application copy 222 may be terminated and restarted; whereupon the data and nondeterministic values 230 used to execute the application 210 may be provided to the restarted application copy 222 in order to align the state of the application copy 222 with the application 210.

In a further example, a redundant computing instance 220 may be selected as a nondeterministic data source for other redundant computing instances 220 as a result of a failure of a primary computing instance 208. For example, an agreement among the redundant computing instances 220 may result in the selection of a redundant computing instance 220 to serve as the nondeterministic value source. As one example, a voting process may be implemented among the redundant computing instances 220 where the voting process may be based on some factor pertaining to a computing instances ability to serve as the nondeterministic data source. In the event that the primary computing instance 208 fails, the voting process may be executed and a redundant computing instance 220 may be selected as the new nondeterministic data source.

The selection of a computing instance as a nondeterministic data source, in one example, may be the result of a determination that an operational state of the computing instance may be healthier as compared to an operational state of one or more other computing instances. Illustratively, the health of an operational state of a computing instance may be based on various factors that include an average computational work load, available memory, available network bandwidth, hardware specifications, reliability, and the like.

In another example, a primary computing instance 208 serving as a nondeterministic value source may be configured to handle data requests that are in addition to nondeterministic data value requests made by a redundant computing instance(s) 220. The primary computing instance 208 may obtain the requested data and return the requested data to the redundant computing instance(s) 220, or may provide the redundant computing instance(s) 220 with a cached copy of the data. More specifically, request traffic associated with obtaining data for the execution of an application copy 222 on a redundant computing instance 220 may be routed to the primary computing instance 208 or the request coordination service 216. The primary computing instance 208 or the request coordination service 216 may then request the data from a data source and then provide the redundant computing instance 220 with a copy of the data received by the primary computing instance 208 or the request coordination service 216.

As an illustration, a redundant computing instance 220 may execute an application copy 222 instruction that queries a database for data. The query may be routed to the primary computing instance 208 and, in the case that the primary computing instance 208 has already queried the database, a cached copy of the data may be provided to the redundant computing instance 220. In the case that the primary computing instance 208 has not yet queried the database, the primary computing instance 208 may query the database and then provide the redundant computing instance 220 with a copy of the data returned by the query.

In an alternative example, a primary computing instance 208 may include a nondeterministic value module (not shown) that may be configured to generate nondeterministic values in response to nondeterministic value requests from an application 210 executing on the primary computing instance 208. The nondeterministic value module on the primary computing instance 208 may be further configured to coordinate nondeterministic value requests received from a redundant computing instance 220 that, for example, also includes a nondeterministic value module configured to make nondeterministic value request to the primary computing instance 208. Namely, the nondeterministic value modules included on the primary computing instance 208 and redundant computing instances 220 may be configured to communicate with one another where one of the nondeterministic value modules provides nondeterministic values to the other nondeterministic value modules.

In another alternative example, a request coordination service may be included within a control plane of a computing service environment 202. An instance manager may include an instance metadata service (not shown) that is able to receive various information from the control plane, such as an instance identity, key values, etc., as well as nondeterministic values generated by the request coordination service. When a computing instance 208, 220 is launched, the computing instance 208, 220 may be configured to request nondeterministic values from the instance metadata service, which in turn may request a nondeterministic value from the request coordination service located within the control plane. After receiving a nondeterministic value from the request coordination service, the instance metadata service may provide the nondeterministic value to the computing instance.

Figure 3:
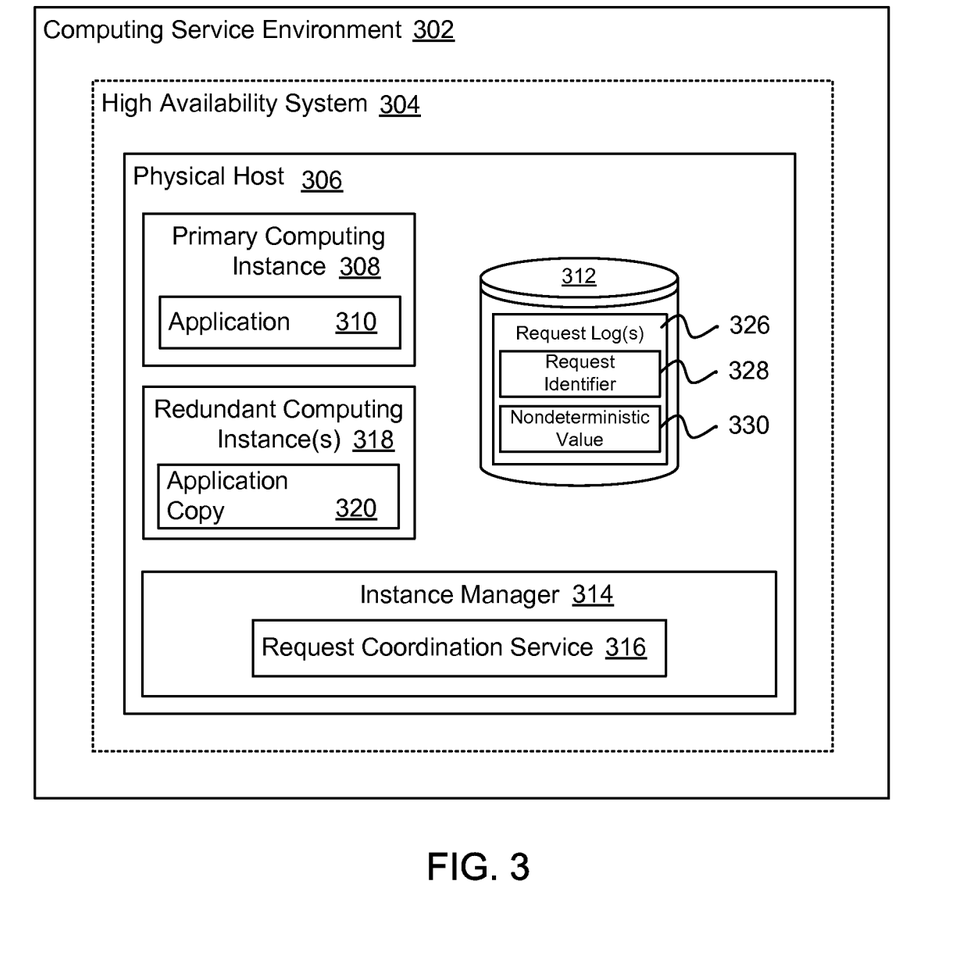
FIG. 3 is a block diagram illustrating an example high availability system that includes a primary computing instance and redundant computing instance executing on a single physical host.

FIG. 3 is a block diagram illustrating an alternative example configuration of a high availability system 304. A physical host 306 within a computing service environment 302 may include a primary computing instance 308 executing an application 310 and one or more redundant computing instances 318 executing application copies 320 (e.g., the primary computing instance 308 and the redundant computing instance(s) 318 may be collocated on the physical host 306). The physical host 306 may include an instance manager 314 and a request coordination service 316. A data store 312 that stores the request logs 326 as described earlier may also be included on the physical host 306.

In one example, the primary computing instance 308 may act as a nondeterministic data source for the one or more redundant computing instances 318 collocated on the physical host 306 (e.g., nondeterministic values may be generated on the primary computing instance 308), and the request coordination service 316 may coordinate nondeterministic value requests made by the redundant computing instances 318. For example, an application 310 instruction executed on the primary computing instance 308 may result in a nondeterministic value request made to the operating system of the primary computing instance 308. The nondeterministic value generated in response to the request may then be used in executing the application 310 and may be saved to a request log 326 with an associated request identifier 328, making the nondeterministic value 330 available to redundant computing instances 318, as described earlier.

In another example, the instance manager 314 may act as the nondeterministic data source for the primary computing instance 308 and the redundant computing instance(s) 318. For example, the computing instances 308 and 318 may be configured to send nondeterministic value requests to the instance manager 314 that includes a request coordination service 316 that coordinates the nondeterministic value requests.

In another example, a nondeterministic value service (e.g., the nondeterministic value service 132 as shown in FIG. 1) that handles nondeterministic value requests may be included on the physical host 306. The primary computing instance 118 and the redundant computing instance(s) 126 may make nondeterministic value requests to the nondeterministic value service, which may be configured to coordinate the nondeterministic value requests as described earlier.

The various processes and/or other functionality contained within the computing service environments illustrated in FIG. 1, FIG. 2 and FIG. 3 may be executed on one or more processors that are in communication with one or more memory modules. The computing service environments may include a number of computing devices that are arranged, for example, in one or more server banks or computer banks or other arrangements. The computing devices may support a computing environment using the instance managers as illustrated, which may include a hypervisor, a virtual machine monitor (VMMs) and other virtualization software. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

A network may facilitate communication between the components of the computing service environments. A network may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 1, FIG. 2 and FIG. 3 illustrate that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While examples of systems are illustrated that may implement the techniques above, many other similar or different environments are possible. The example environments discussed and illustrated above are merely representative and not limiting.

Figure 4:
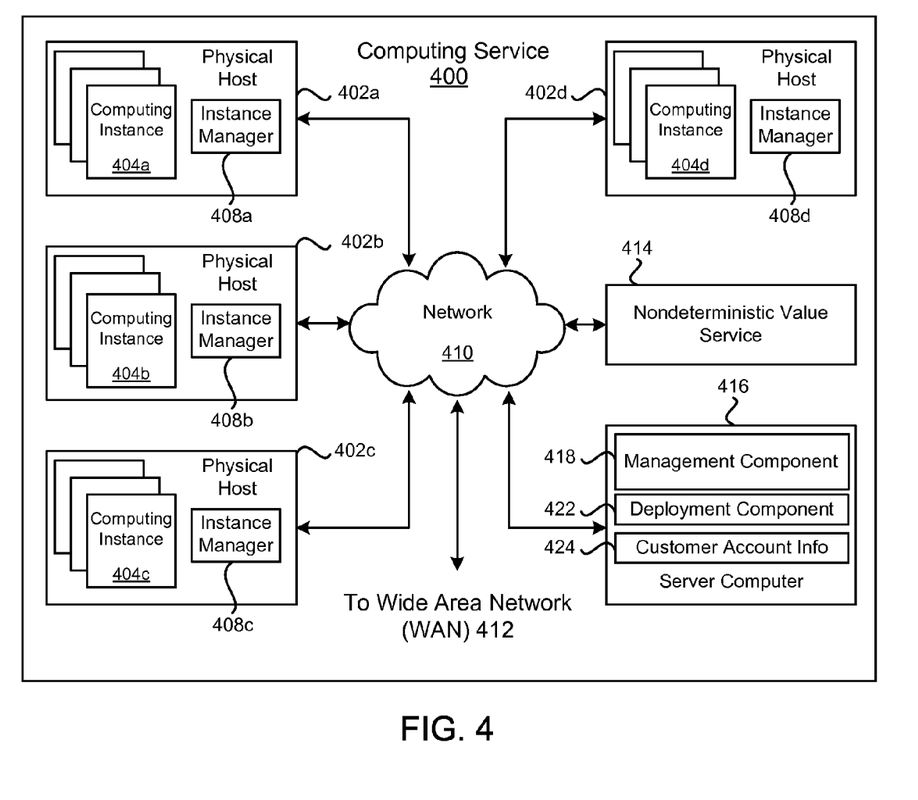
FIG. 4 is a block diagram that illustrates an example computing service environment that includes a nondeterministic value service used to provide nondeterministic values to computing instances.

FIG. 4 is a block diagram illustrating an example computing service 400 that may be used to execute and manage a number of computing instances 404a-d included in a high availability system. In particular, the computing service 400 depicted illustrates one environment in which the technology described herein may be used. The computing service 400 may be one type of environment that includes various virtualized service resources that may be used, for instance, to host computing instances 404a-d.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by an instance manager, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Those familiar with the art will recognize that the computing service 400 may be described as a "cloud" environment.

The particularly illustrated computing service 400 may include a plurality of server computers 402a-d. While four server computers are shown, any number may be used, and large data centers may include thousands of server computers. The computing service 400 may provide computing resources for executing computing instances 404a-d. Computing instances 404a-d may, for example, be virtual machines. A virtual machine may be an instance of a software implementation of a machine (i.e. a computer) that executes applications like a physical machine. In the example of a virtual machine, each of the server computers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

One or more server computers 414 and 416 may be reserved to execute software components for managing the operation of the computing service 400 and the computing instances 404a-d. For example, a server computer 414 may execute a nondeterministic value service that performs functions, such as generating a nondeterministic value in response to a request from a computing instance 404a-d, as well as coordinating nondeterministic value requests so that a nondeterministic value provided to a redundant computing instance corresponds with a nondeterministic request made by a primary computing instance.

A server computer 416 may execute a management component 418. A customer may access the management component 418 to configure various aspects of the operation of the computing instances 404a-d purchased by a customer. For example, the customer may setup computing instances 404a-d and make changes to the configuration of the computing instances 404a-d.

A deployment component 422 may be used to assist customers in the deployment of computing instances 404a-d. The deployment component 422 may have access to account information associated with the computing instances 404a-d, such as the name of an owner of the account, credit card information, country of the owner, etc. The deployment component 422 may receive a configuration from a customer that includes data describing how computing instances 404a-d may be configured. For example, the configuration may include an operating system, provide one or more applications to be installed in computing instances 404a-d, provide scripts and/or other types of code to be executed for configuring computing instances 404a-d, provide cache logic specifying how an application cache should be prepared, and other types of information. The deployment component 422 may utilize the customer-provided configuration and cache logic to configure, prime, and launch computing instances 404a-d. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402a-d, 416.

The network 410 may be a local area network (LAN) and may be connected to a Wide Area Network (WAN) 412 or the Internet, so that end customers may access the computing service 400. The network topology illustrated in FIG. 4 has been simplified, many more networks and networking devices may be utilized to interconnect the various computing systems disclosed herein.

Figure 5A:
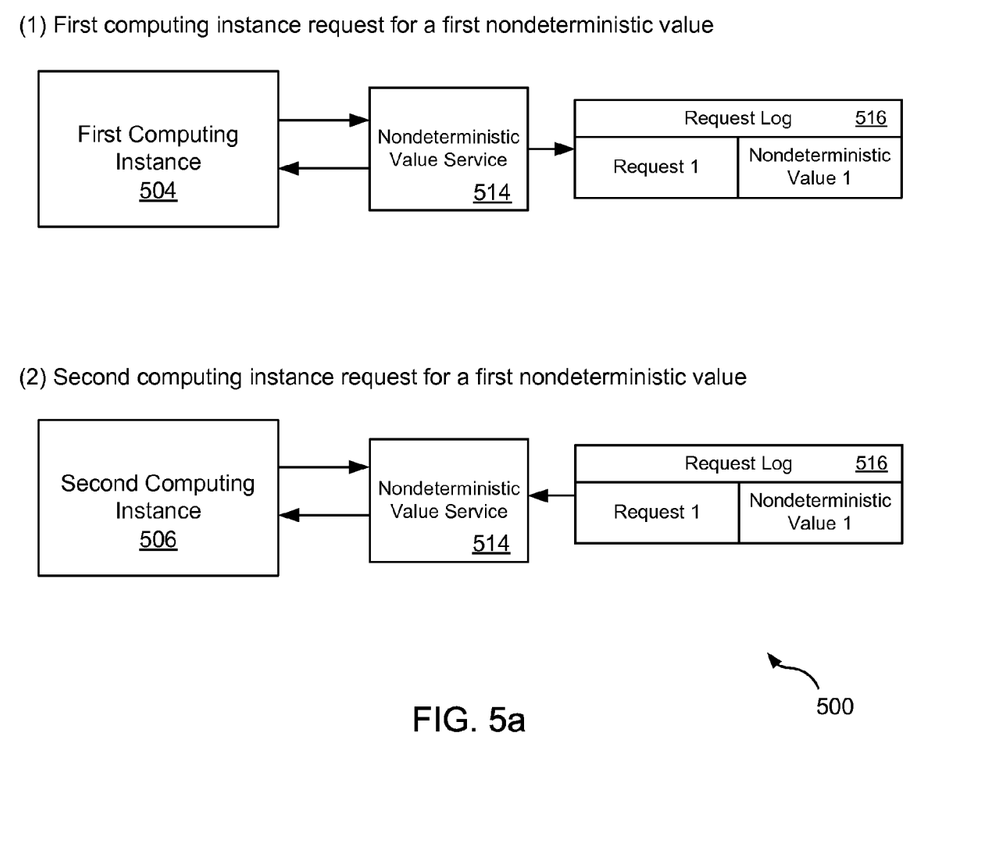
FIGS. 5*a-c* are block diagrams that illustrate an example method for coordinating nondeterministic value requests received from a first computing instance and a second computing instance.
Figure 5B:
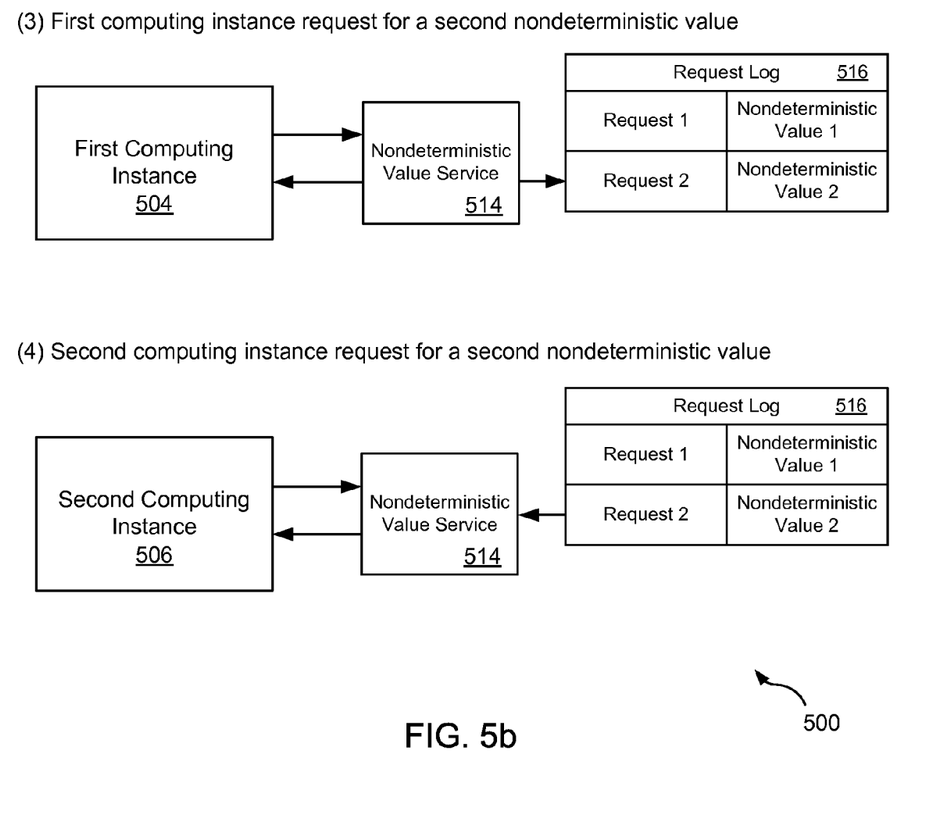
Figure 5C:
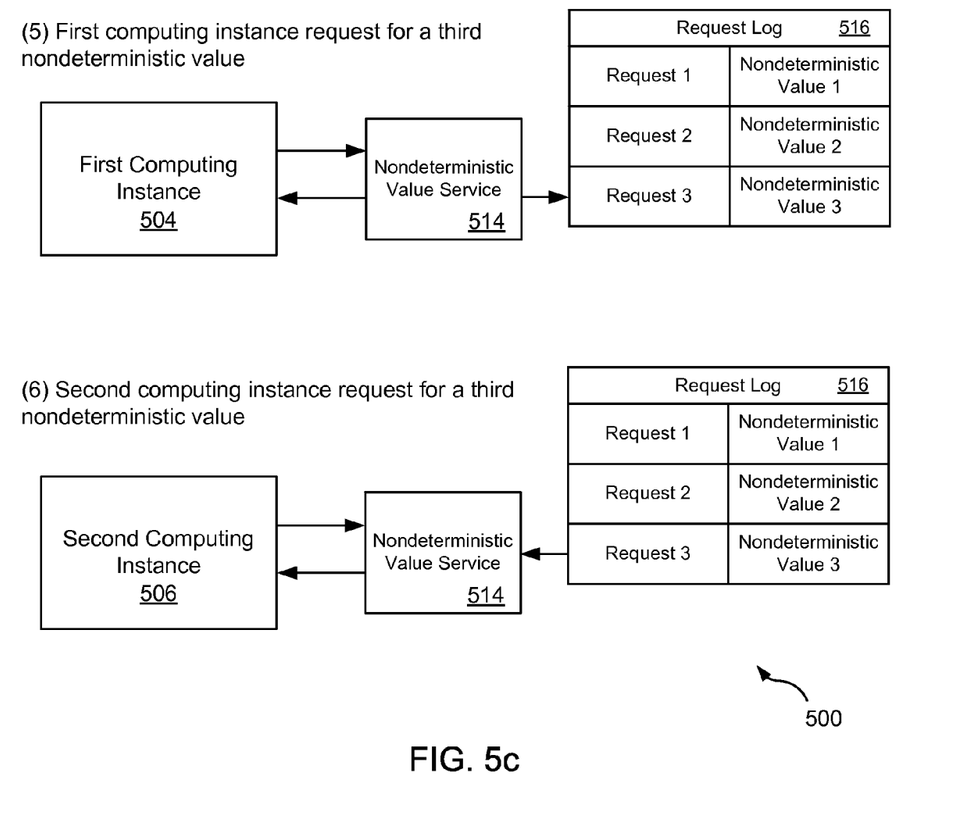

FIGS. 5a-c are block diagrams illustrating an example method 500 for coordinating nondeterministic value requests that may be received from a first computing instance 504 and a second computing instance 506. As shown in FIG. 5a, a nondeterministic value service 514 may receive a request from a first computing instance 504 for a nondeterministic value. In one example, a nondeterministic value request may include a parameter having a unique value that may be used to identify the request. For example, a first computing instance 504 and a second computing instance 506 may be configured to include the parameter in a nondeterministic request. The computing instances 504 and 506 may further be configured to include a unique value in the parameter that identifies the sequence of the nondeterministic request. A unique value included in a particular request by the first computing instance 504 may be the same unique value included in a duplicate request made by the second computing instance 506. As a specific example, a first request made by the first computing instance 504 may include a request identifier value of "0001", and a duplicate first request made by the second computing instance 506 may include a duplicate request identifier value of "0001". With each successive request made by the computing instances 504 and 506, the value of the request identifier value may be incremented.

In an alternative example, in response to a nondeterministic request, the nondeterministic value service 514 may be configured to query a request log 516 to determine the identity of the request. For example, a determination may be made as to whether the request is a first request, second request, and so on by referencing a request log associated with the computing instance making the request. By determining the identity of a last request recorded in the request log, the identity of a current request may be identified. As a specific example, a request log may be queried for the last request identifier added to the request log (e.g., "0006") and the last request identifier may then be incremented to identify the current request.

Having identified the nondeterministic request, the nondeterministic value service 514 may be configured to generate a nondeterministic value according to specifications of the request. For example, a nondeterministic request may include a parameter specifying a type of nondeterministic value that is being requested. Illustratively, the request may be for a random number or a time value, such as a hardware timer value or a software timer value. The nondeterministic value may then be returned to the first computing instance 504, and the request log 516 may be updated with a request identifier for the request and the nondeterministic value that was provided to the first computing instance 504 in response to the request.

As illustrated, the nondeterministic value service 514 may then receive a nondeterministic value request from a second computing instance 506. A request identifier may be included in the request that identifies the request as a first request. The nondeterministic value service 514 may be configured to query the request log 516 using the request identifier to retrieve a nondeterministic value associated with the request identifier from the request log 516. The nondeterministic value may then be returned to the second computing instance 506.

FIG. 5b illustrates that the nondeterministic value service 514 may receive a second request from the first computing instance 504 and that a nondeterministic value generated in response to the request and a request identifier for the request may be stored in the request log 516. As a result of receiving a second request from the second computing instance 506, the nondeterministic value service 514 may be configured to retrieve the nondeterministic value from the request log 516 using a request identifier included in the request. FIG. 5c illustrates responses to a third request for a nondeterministic value from the first computing instance 504 and the second computing instance 506 as described above. The method 500 may be used to respond to additional nondeterministic value requests as described above. Although FIGS. 5a-c illustrate a sequence of nondeterministic requests that alternate between the first computing instance 504 and the second computing instance 506, any sequence of nondeterministic requests that may be made are included within the scope of this disclosure.

Figure 6:
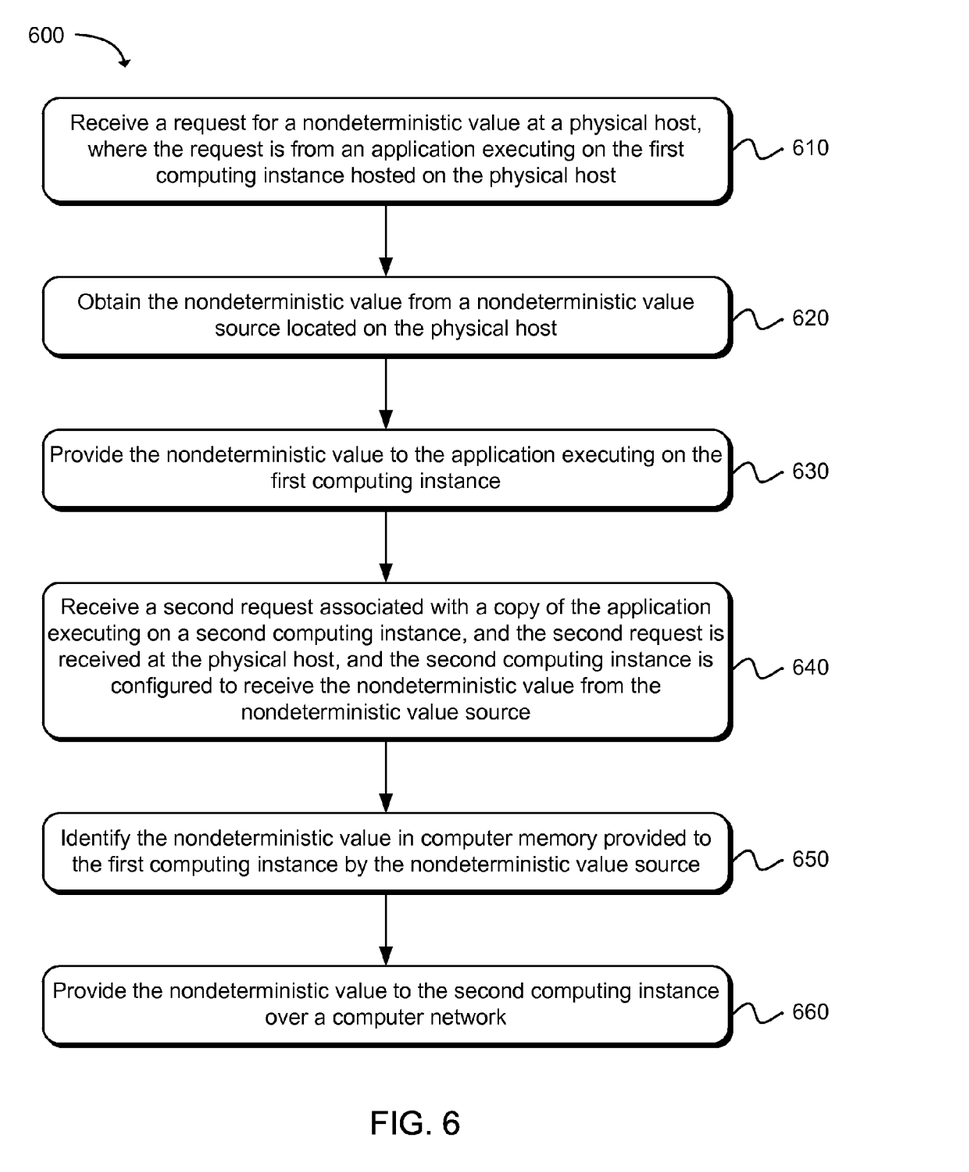
FIG. 6 is a flow diagram illustrating an example method for providing a nondeterministic value to computing instances executing an application as part of a high availability system.

FIG. 6 is a flow diagram illustrating an example of a method 600 for providing a nondeterministic value to computing instances executing an application as part of a high availability system. Starting in block 610, a request for a nondeterministic value may be received at a physical host, where the request may be from an application executing on a first computing instance hosted on the physical host. For example, a first computing instance and a second computing instance may be configured as a redundant pair where the first computing instance executes an application and the second computing instance executes a copy of the application. In the event that the first computing instance fails, a failover to the second computing instance may be performed. Alternatively, software containers may be configured as a redundant pair, wherein the software containers may be configured to obtain nondeterministic values from a nondeterministic value source.

Having received the request at the physical host, as in block 620, the nondeterministic value may be obtained from a nondeterministic value source located on the physical host. For example, the operating system for the first computing instance may provide the nondeterministic value. Alternatively, a kernel module included in an instance manager (e.g., hypervisor or VMM) associated with the first computing instance may provide the nondeterministic value or the nondeterministic value may be obtained from a service that provides nondeterministic values that may be independent of the first computing instance and the second computing instance.

As in block 630, the nondeterministic value may be provided to the application executing on the first computing instance, and the nondeterministic value may be stored in computer memory where the nondeterministic value may be associated with the request. As in block 640, a second request associated with a copy of the application executing on a second computing instance may be received at the physical host. The second computing instance may be configured to receive the nondeterministic value from the nondeterministic value source.

After receiving the second request, as in block 650, the nondeterministic value may be identified in the computer memory provided to the first computing instance by the nondeterministic value source. For example, the nondeterministic value may be identified as being associated with an identical request associated with the copy of the application executing on the first computing instance. As in block 660, the nondeterministic value may then be provided to the second computing instance over a computer network.

Figure 7:
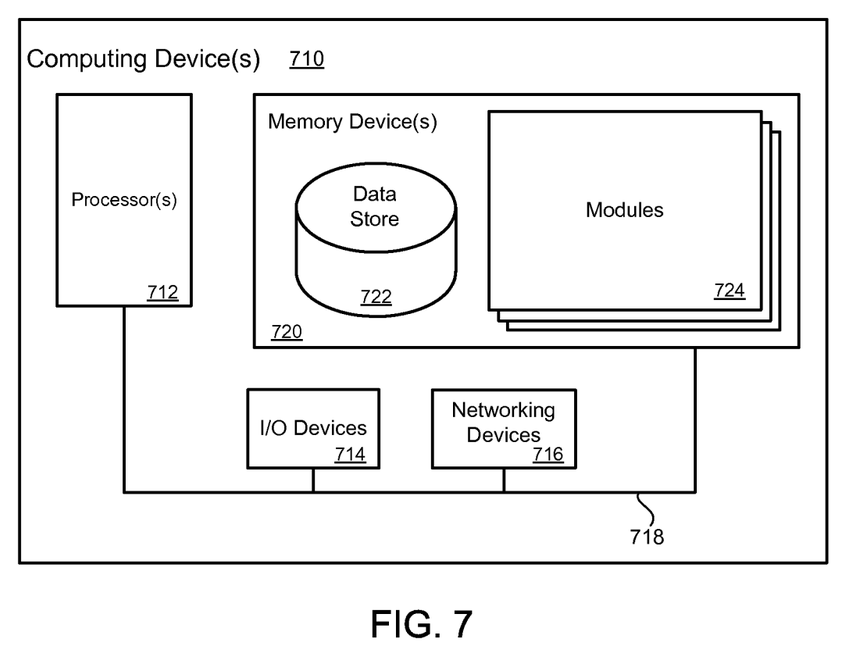
FIG. 7 is block diagram illustrating an example of a computing device that may be used to execute a method for providing nondeterministic values to computing instances included in a high availability system.

FIG. 7 illustrates a computing device 710 on which modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 724 that are executable by the processor(s) 712 and data for the modules 724. The modules 724 may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. Networking devices 716 and similar communication devices may be included in the computing device. The networking devices 716 may be wired or wireless networking devices that connect to the internet, a LAN, WAN, or other computing network.

The components or modules that are shown as being stored in the memory device 720 may be executed by the processor(s) 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed by a processor:
   receive a request for a nondeterministic value from a first computing instance executing an application on a first physical host, and the first computing instance is configured to obtain the nondeterministic value from a nondeterministic data source;
   provide the nondeterministic value to the first computing instance;
   receive a request for the nondeterministic value from a second computing instance executing a copy of the application on a second physical host, and the first computing instance and the second computing instance are configured as a redundant pair;
   identify the nondeterministic value provided to the first computing instance, in response to the request from the second computing instance, and the second computing instance is configured to obtain the nondeterministic value from the nondeterministic data source; and
   provide a duplicate of the nondeterministic value to the second computing instance in order to provide an execution state of the copy of the application executing on the second computing instance that duplicates the execution state of the application executing on the first computing instance.

2. A non-transitory machine readable storage medium as in claim 1, wherein the nondeterministic data source is provided by a computing instance that is independent of the first computing instance and the second computing instance.

3. A non-transitory machine readable storage medium as in claim 1, wherein the nondeterministic value is a random number generated by a random number generator or a hardware time value.

4. A non-transitory machine readable storage medium as in claim 1, wherein instructions that when executed by the processor further failover to the second computing instance as a result of a failure of the first computing instance.

5. A computer implemented method, comprising:
   receiving a request for a nondeterministic value at a physical host, using a processor, where the request is from an application executing on a first computing instance hosted on the physical host;
   obtaining the nondeterministic value from a nondeterministic value source located on the physical host, using the processor;
   providing the nondeterministic value to the application executing on the first computing instance, using the processor;
   receiving a second request associated with a copy of the application executing on a second computing instance, and the second request is received at the physical host, wherein the second computing instance is configured to obtain the nondeterministic value from the nondeterministic value source;
   identifying the nondeterministic value in computer memory provided to the first computing instance by the nondeterministic value source, using the processor; and
   providing the nondeterministic value to the second computing instance over a computer network, using the processor.

6. A method as in claim 5, wherein obtaining a nondeterministic value in response to the request associated with the application executing on the first computing instance further comprises, obtaining the nondeterministic value from an instance manager located on the physical host.

7. A method as in claim 5, wherein obtaining a nondeterministic value in response to the request associated with the application executing on the first computing instance further comprises, obtaining the nondeterministic value from an operating system of the first computing instance located on the physical host.

8. A method as in claim 7, further comprising selecting the first computing instance as the nondeterministic data source as a result of an agreement among a plurality of computing instances.

9. A method as in claim 7, further comprising selecting the first computing instance as the nondeterministic data source as a result of a determination that an operational state of the first computing instance is healthier as compared to an operational state of the second computing instance.

10. A method as in claim 5, wherein obtaining the nondeterministic value in response to the request associated with the application executing on the first computing instance further comprises, storing the nondeterministic value in computer memory where the nondeterministic value is associated with the request.

11. A method as in claim 5, wherein identifying the nondeterministic value in the computer memory in response to the request associated with the application executing on the second computing instance further comprises, identifying the nondeterministic value as being associated with an identical request associated with the application executing on the first computing instance.

12. A method as in claim 5, wherein the nondeterministic value source located on the physical host is a non deterministic value service that executes on the first computing instance.

13. A method as in claim 5, further comprising:
   routing request traffic sent by the second computing instance to the first computing instance; and providing the second computing instance a copy of request traffic received by the first computing instance.

14. A method as in claim 5, further comprising:
configuring the first computing instance and the second computing instance to execute the application as a redundant pair; and
failing over to the second computing instance as a result of a failure of the first computing instance.

15. A method as in claim 5, further comprising detecting that a sequence of nondeterministic values provided to the second computing instance is different than a sequence of nondeterministic values provided to the first computing instance.

16. A method as in claim 15, further comprising removing the second computing instance from a pool of computing instances that are executing the application as a result of detecting that the sequence of nondeterministic values used by the second computing instance is different than the sequence of nondeterministic values provided to the first computing instance.

17. A system comprising:
at least one processor;
at least one memory device including instructions that, when executed by the processor, cause the system to:
launch a first application on a first physical host and a second application on a second physical host, wherein the first application and the second application receive nondeterministic values from a central nondeterministic data source, and the first application and the second application are executed as a redundant pair;
receive a request for a nondeterministic value associated with the first application executing on the first physical host;
provide the nondeterministic value to the first application;
identify the nondeterministic value in response to a second request for the nondeterministic value associated with the second application executing on a second physical host;
provide the nondeterministic value to the second application executing on the second physical host; and
failover to the second application as a result of the first application failing.

18. A system as in claim 17, wherein the memory device includes instructions that, when executed by the processor, causes the system to route requests for the nondeterministic value made by the application to the central nondeterministic data source.

19. A system as in claim 17, wherein the memory device includes instructions that, when executed by the processor, causes the system to execute the first application and the second application on computing instances hosted by the first physical host and the second physical host included within a computing service environment.

20. A system as in claim 17, wherein the memory device includes instructions that, when executed by the processor, causes the system to execute the first application and the second application on software containers hosted by the first physical host and the second physical host included within a computing service environment.

* * * * *